United States Patent
Krieger et al.

(10) Patent No.: US 7,114,525 B2
(45) Date of Patent: Oct. 3, 2006

(54) METHOD AND APPARATUS FOR REDUCTION OF FLUID-BORNE NOISE IN HYDRAULIC SYSTEMS

(75) Inventors: Clifford P Krieger, Dryden, MI (US); James P Beatty, Marysville, MI (US); Thomas E Castaldi, Lake Orion, MI (US); Myles E Davis, Milford, MI (US); Daryl A Sinclair, Clarkston, MI (US)

(73) Assignee: Dana Corporation, Toledo, OH (US)

( * ) Notice: Subject to any disclaimer, the term of this patent is extended or adjusted under 35 U.S.C. 154(b) by 339 days.

(21) Appl. No.: 10/652,103

(22) Filed: Aug. 29, 2003

(65) Prior Publication Data

US 2005/0045239 A1 Mar. 3, 2005

(51) Int. Cl.
*F15D 1/02* (2006.01)

(52) U.S. Cl. ......................................... 138/44; 138/30

(58) Field of Classification Search ................. 138/30, 138/44
See application file for complete search history.

(56) References Cited

U.S. PATENT DOCUMENTS

| | | | | |
|---|---|---|---|---|
| 1,847,086 A | * | 3/1932 | Gargan | ............... 200/81.5 |
| 2,146,100 A | * | 2/1939 | Walch | ............... 417/151 |
| 2,223,242 A | * | 11/1940 | Sweet, Jr. | ............... 417/195 |
| 2,790,463 A | * | 4/1957 | Delano et al. | ............... 138/44 |
| 3,109,459 A | * | 11/1963 | Lee, II | ............... 138/40 |
| 3,146,798 A | * | 9/1964 | Chenault | ............... 138/44 |
| 3,894,562 A | | 7/1975 | Moseley, Jr. et al. | |
| 4,285,534 A | | 8/1981 | Katayama et al. | |
| 4,426,213 A | * | 1/1984 | Stavropoulos | ............... 55/466 |
| 4,762,150 A | * | 8/1988 | Kokuryu | ............... 138/44 |
| 5,094,271 A | | 3/1992 | Fritz et al. | |
| 5,111,660 A | | 5/1992 | Gettel | |
| 5,529,244 A | | 6/1996 | Horvath, Jr. et al. | |
| 5,582,006 A | | 12/1996 | Phillips | |
| 5,728,981 A | * | 3/1998 | van Ruiten | ............... 181/233 |
| 5,749,396 A | | 5/1998 | Takahashi et al. | |
| 5,906,225 A | * | 5/1999 | Stark et al. | ............... 138/41 |

(Continued)

FOREIGN PATENT DOCUMENTS

EP 0305877 A2 3/1989

(Continued)

OTHER PUBLICATIONS

EPO Search Report Applicant: Dana Corporation Ref. No. P102079EP00/FRC Patent No. 04255183, Dec. 2004.

*Primary Examiner*—James Hook
(74) *Attorney, Agent, or Firm*—Reising, Ethington, Barnes, Kisselle, P.C.

(57) ABSTRACT

Method and apparatus for eliminating turbulence-induced noise in a pulsation-absorbing flexible hose, as in a hydraulic power steering system containing a pressure fluid-feeding pump and a steering gear operated by the pressure fluid discharged from the pump. The hose has a restrictor positioned in the hose bore, and the restrictor has a flow-through bore of smaller diameter than that of the adjacent wall of the hose bore. The flow-through bore has a venturi tube cross section. The restrictor venturi inlet, throat and outlet are designed so as to efficiently conduct fluid therethrough by matching the characteristics of the fluid, the operational pressures, fluid density and other system parameters such that the venturi operates below the lower critical value of the Reynolds number of fluid flow through the restrictor to thereby minimize or eliminate fluid turbulence in the restrictor outlet and/or immediately downstream thereof.

9 Claims, 3 Drawing Sheets

U.S. PATENT DOCUMENTS

| | | |
|---|---|---|
| 6,024,129 A | 2/2000 | Schima |
| 6,035,897 A * | 3/2000 | Kozyuk ........................ 138/37 |
| 6,073,656 A * | 6/2000 | Chen et al. ................... 138/26 |
| 6,119,728 A * | 9/2000 | Seidel-Peschmann et al. .......................... 138/26 |
| 6,269,841 B1 * | 8/2001 | Chen et al. ................... 138/30 |
| 6,279,613 B1 | 8/2001 | Chen et al. |
| 6,419,278 B1 | 7/2002 | Cunningham |
| 6,442,838 B1 | 9/2002 | Mussler |
| 6,591,870 B1 | 7/2003 | Bhattacharyya et al. |

FOREIGN PATENT DOCUMENTS

| | | |
|---|---|---|
| EP | 1162399 A2 | 12/2001 |

\* cited by examiner

METHOD AND APPARATUS FOR REDUCTION OF FLUID-BORNE NOISE IN HYDRAULIC SYSTEMS

FIELD OF THE INVENTION

This invention relates to noise and/or vibration attenuation apparatus for a system conveying liquid under pressure and to a method of attenuating noise and/or vibration in such a system, particularly in the hydraulic system of the power steering unit of a vehicle.

BACKGROUND AND SUMMARY OF THE INVENTION

Fluid-borne noise is commonly present in hydraulic systems powered by pumping apparatus such as gear, vane or piston pumps. Typically, the noise results when pressure waves generated as pump flow ripple encounter system flow impedance. Fluid-borne noise present in a hydraulic system causes mechanical apparatus, such as hydraulic lines, control valves, hydraulic motors, and supporting structural members, to vibrate. In many cases, such vibration is coupled to the atmosphere and is the source of objectionable acoustic noise. It is of course, desirable to attenuate such fluid-borne noise.

Fluid-borne noise reduction apparatus in the high pressure side of the prior art power steering system usually comprises a flexible metal or plastic tube, called a tuning cable, placed inside a section of volumetrically compliant hose. One of the earliest such prior art apparatus is that disclosed in Klees U.S. Pat. No. 3,323,305.

In the low pressure side of prior art power steering systems, another type of "tuning"0 device is used, one that does not employ the tube-within-tube tuning cable concept but rather simply a restrictor in the return hose line. Such restrictors usually are of the constant-diameter-passageway type shown as restrictor 10 in Katayama et al. U.S. Pat. No. 4,285,534. Such restrictor elements are inserted in a selected location in the low pressure return line flexible hose to form a flow barrier that helps "balance"0 pressures in the power steering system and thereby prevent "shudder"0 under certain operating conditions, as is well understood in this art.

In many power steering systems, such a balancing restrictor inserted in the return side of the circuit typically operates under system fluid pressures of approximately 100 to 150 psi, which are much lower pressures than are typical in the pump output side of the power steering circuit where pressures may be in the vicinity of 1500 psi. In accordance with the present invention, it was noted that under certain conditions the return side restrictor produced an audible "hiss" noise that could be heard in the passenger cab. It was speculated that the cause might be the abrupt internal angle (chamfer) at the entrance to the flow-through, constant diameter passage of the restrictor, the abrupt angle at the exit of this flow-through passage, the surface finish of the passage, the possibly sharp edges at the entrance and exit of the flow-through passage, as well as the abrupt diameter differential between the hose I.D. and the restrictor passage I.D. Any or all of these parameters were thought to have contributed to making the fluid flow go turbulent in the vicinity of the exit of the restrictor flow-through passage, thereby producing the "hiss" noise.

Another problem, unrelated to the noise problem experienced with the current production low pressure side restrictor (often referred to in the trade as a "dogbone"), was hose pinching when the crimp collar location was not correct relative to the dogbone exterior shape of the restrictor. In such cases, the raised edge of the restrictor sometimes caused hose damage and failure.

Assuming that the "hiss" noise problem was indeed due to the creation of a turbulence condition in the fluid flow just before or after the exit of the restrictor, ancillary problems would be excessive pressure drop and heat generated by such turbulence, as well as potential cavitation wear on the wall of the tubing. Moreover, these ancillary problems could be present even in the absence of the turbulence reaching a level sufficient to produce the annoying audible "hiss" sound.

Accordingly, and by way of summary description, and not by way of limitation, the present invention is directed to providing a new form of restrictor for use in noise-reduction fluid conduits subject to pressure pulsations. The restrictor has a central flow-through passage open at its opposite axial ends, but this flow-through passage is configured in the form of a classic venturi instead of the conventional constant diameter flow-through passage. In a present preferred but exemplary embodiment of the invention, the restrictor has its flow-through passage configured as a venturi having a shallow convergent (in the direction of fluid flow) tapered inlet, a constant diameter throat and a shallow divergent (in direction of fluid flow) tapered outlet. The restrictor flow-through passage is thus constructed with the configuration of a venturi inlet, throat and outlet arranged and operable, under the pressure and fluid flow conditions in which the restrictor is used, so as to minimize turbulence in the restrictor outlet and/or immediately downstream thereof.

Preferably the cross sectional configuration of the interior of the restrictor is symmetrical about all axes, and the taper angle for both the inlet and the outlet is approximately 8°. Although the restrictor can be made of metallic material such as brass, aluminum or steel, it is preferred to injection mold the restrictor out of a suitable plastic material to achieve smoother wall surfaces in the flow-through passage, as well as for economy of system assembly and part costs.

In accordance with the method of the invention, the venturi inlet, throat and outlet are designed so as to conduct fluid therethrough in the operating system of the pressure fluid device by matching the characteristics of the fluid, the operational pressures, fluid density and other relevant system parameters, such that the venturi operates below the lower critical value of the Reynolds number of the fluid flow through the restrictor to thereby minimize or eliminate noise by minimizing or eliminating turbulence in the fluid in the restrictor outlet and/or exiting immediately downstream from the venturi restrictor. As indicated hereinabove, the venturi restrictor of the invention is presently intended primarily for use in the power steering return line to the system reservoir that supplies the pump input side of the power steering circuit where fluid pressures of 100 to 150 psi are typical, because this appears to be the area where the turbulence problems are most acute and are manifesting themselves with the annoying "hiss" noise. However, the preferred embodiment of the restrictor, due to its other advantageous features as well as the venturi shape of the flow-through passage, may also be advantageously employed in the high pressure side of the power steering circuit as a central restrictor in the typical tuning cable assembly employed in this side of the system.

Other and ancillary novel features of the invention will become apparent from the following detailed description and appended claims.

BRIEF DESCRIPTION OF THE DRAWINGS

The invention, together with additional objects, features and advantages thereof, will be best understood from the following detailed description, the appended claims and the accompanying drawings in which:

DETAILED DESCRIPTION OF THE PREFERRED EMBODIMENTS

Figure 1:
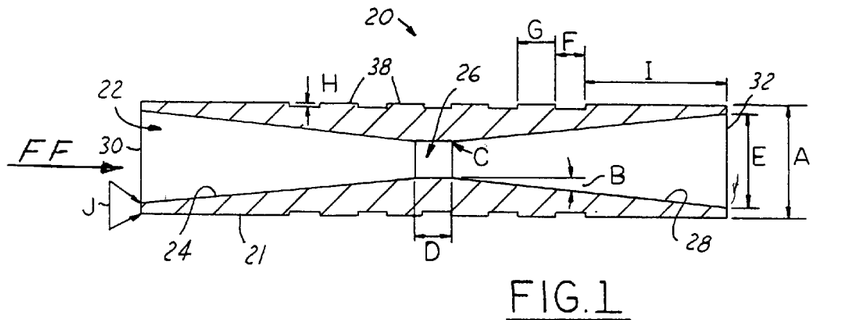
FIG. 1 is a longitudinal center cross sectional view, taken on the section line 1—1 of FIG. 2, of a presently preferred but exemplary embodiment of a power steering restrictor component constructed in accordance with the present invention.
Figure 2:
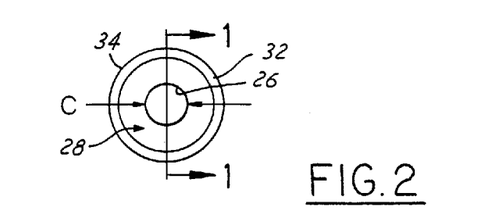
FIG. 2 is an end view of the exit end of the restrictor of FIG. 1, i.e., the right hand end of the restrictor as viewed in FIG. 1.
Figure 3:
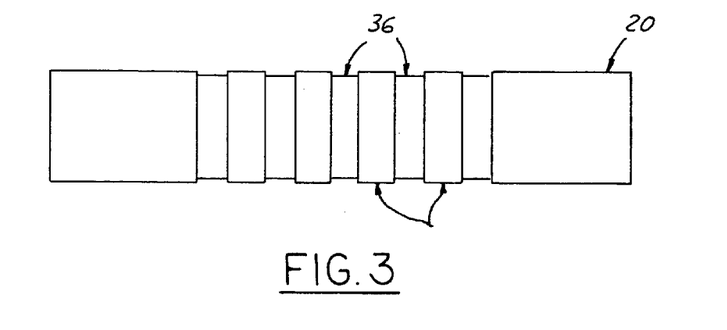
FIG. 3 is a side elevational view of a prototype constructed pursuant to FIGS. 1 and 2.

FIGS. 1 and 2 illustrate a power steering system restrictor 20 constructed in accordance with a presently preferred first embodiment of the invention. The direction of fluid flow through restrictor 20 is indicated by the arrow FF in FIG. 1. Various dimensional parameters are designated by the dimensional lines and arrows labeled "A through J" and are tabulated hereinafter by way of a working example.

Restrictor 20 generally comprises a tubular metallic body having a cylindrical exterior surface 21 with an outside diameter (O.D. dimension) designated by reference character "A" in FIG. 1. Resrictor 20 has a central flow-through passage 22 open at its opposite axial ends and constructed in the form of a venturi passage as defined by a shallow tapered inlet passage 24, a relatively short length constant diameter throat passage 26, and a shallow tapered outlet passage 28. Preferably the cross sectional configuration of the interior of the restrictor, as defined by passage sections 24, 26 and 28, is symmetrical about all axes. Preferably the taper angle "B" for both the inlet and outlet is about 8°. It will be seen that the inlet passage 24 is convergent in the direction of fluid flow FF, and outlet passage 28 is divergent in the direction of fluid flow FF. The diameter dimension of throat passage 26 is indicated by the reference character "C". The axial length of throat 26 is designated by the reference character "D". The maximum I.D. of inlet passage 24 at its inlet end 30 is the same as that of the outlet passage 28 at its outlet end 32 and is designated by the reference character "E" in FIG. 1.

Preferably the external surface 21 of restrictor 20 is interrupted in its central region by a series of five shallow grooves 36 that define therebetween a series of four equally spaced and equal axial length lands 38. The axial length dimension of each grooves 36 is designated by the reference character "F", whereas the axial length dimension of each land 38 is designated by the reference character "G". The depth dimension of each groove 36 is indicated by the reference character "H", and the distance from the endmost of grooves 38 to the associated inlet end 30 or outlet end 32 is designated by the dimension indicated by the reference character "I". Preferably the end edges of inlet end 30 and outlet end 32 are chamfered to the specification indicated by the reference character "J".

By way of preferred working example, the following values may be employed in constructing the preferred but exemplary embodiment of restrictor 20 shown in FIGS. 1 and 2.

| Dimensional Parameter | Value (in metric units) | Range (in metric units) |
|---|---|---|
| A | 9.017–8.763 mm | 10.033–8.765 mm |
| B | 8° | 4°–15° |
| C | 2.64–2.89 mm | 2.64–4.57 mm |
| D | 2.667–2.43 mm | .76–12.2 mm |
| E | 7.493 Ref. mm | |
| F | 1.905–1.651 mm | .127–1.651 mm |
| G | 2.667–2.413 mm | .76–2.667 mm |
| H | .203–.406 mm | .127–.406 mm |
| I | 8.052–9.576 mm | |
| J | .457–.203 mm | |

Figure 4:
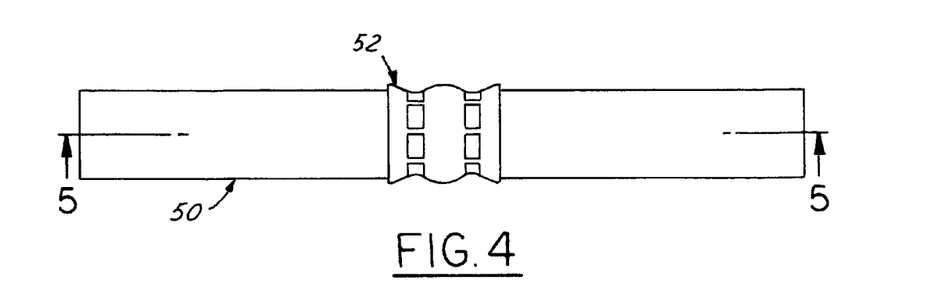
FIG. 4 is a fragmentary elevational view of a section of the power steering return line hose having a restrictor of the invention inserted therein and held in place by a conventional crimp collar.

Preferably the array of five external grooves 36 are formed as sharp edge grooves as disclosed in Cunningham U.S. Pat. No. 6,419,278 issued Jul. 16, 2002 and assigned to the assignee of record herein, namely Dana Corporation of Toledo, Ohio. As so constructed, and as shown in FIG. 4 herein, the sharp edge grooves 36 and associated lands 38 thereby improve sealing with an encompassing rubber composite hose 50 that may be sealably secured onto restrictor 20 with a suitable conventional crimped dogbone collar 52, as is customary practice currently. Although restrictor 20 maybe constructed of metallic material, such as aluminum, brass or steel alloy, and machined to the configuration established by the foregoing dimensional parameters, or even die cast of zinc or similar material, it is preferred to injection mold restrictor 20 of a suitable plastic (polymeric) material, such as high melting polyamides, e.g., nylons, teflons, or lower melting polymeric materials, e.g., HDPE, polypropylene, polyesters, polyurethanes, to thereby achieve smoother wall surfaces in the flow through passageways 24, 26 and 28, as well as for economy of system assembly and part costs.

Note that due to the symmetry of the internal configuration of restrictor 20 the same may be reversed in assembly without affecting operational performance one iota. By injection molding of restrictor 20, the problems of surface finish roughness by machining of the passageways, potentially producing sharp edges and/or burrs at the entrance and exit of the passageway, are eliminated. Moreover, by using the sharp edge alternating grooves 34 and lands 36 feature with the hose clamp 52 and encircling rubber hose 50, good sealing and holding power is obtained while eliminating the problem of hose pinching when the crimp location was not correct relative to the prior restrictor dogbone shape, i.e., the raised edge of the prior restrictor then sometimes causing hose damage and failure.

It has been found that the venturi configured flow-through passageway 22 of restrictor 20, with its narrow taper angles of the inlet and outlet (e.g., 8°), has apparently reduced the Reynolds number of restrictor 20 for the aforementioned low pressure return line power steering system application (also referred in FIG. 8 hereinafter) to an extent sufficient to eliminate the turbulence that caused the "hiss" noise when using the prior art commercial restrictor. The venturi shape allows flow of the power steering fluid without turbulence in the outlet exit throat 28 and/or immediately downstream therefrom in the associated return line hose 50. Since turbulent flow region is not reached in operation with restrictor 20, there is no "hiss" sound emanating from the power steering hose. Moreover, the heat created by the prior turbulence is substantially reduced if not eliminated, thereby enabling the power steering hose system to run cooler. Back pressure losses unavoidably introduced by disposing a restrictor in the return line are also reduced. Making the restrictor 20 by a plastic molding process enhances the surface finish over that of a machined metal counterpart, and renders the flow passage walls smoother, which thereby reduces even more so the Reynolds number of restrictor 20.

Figure 7:
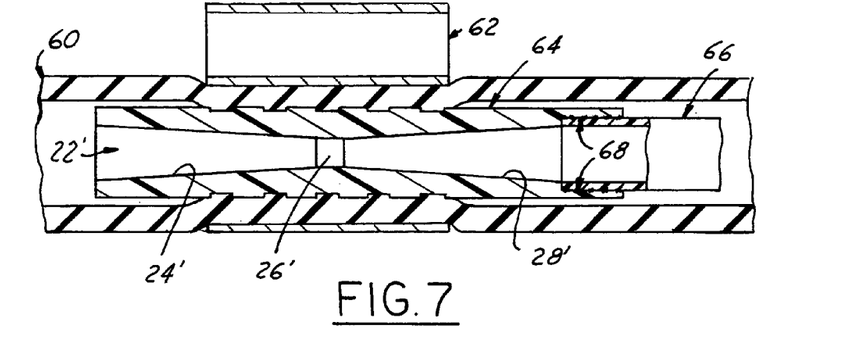
FIG. 7 is a fragmentary longitudinal center section of a tuning cable embodiment of the invention utilizing a modified restrictor of the invention employed in the high pressure side hose of the power steering system.

In the tuning cable embodiment shown in FIG. 7, a system high pressure side hose 60 encompasses a modified restrictor 64 of the invention having the same sharp grooves and lands 36 and 38 as restrictor 20. Due to these grooves and lands, restrictor 64 can be clamped merely with a suitable hose clamp 60 (such as those ear type clamps made by Oetiker® Company of Livingston, N.J., Marlette, Mich. and Hattiesburg, Miss.) at much less clamping pressure than is the case using the high pressure crimped-collar-type seal 52 conventionally employed in such tuning cable or restrictor-return line hose assemblies. Of course, if the holding power of this type clamp 60 is not sufficient for a given high pressure line application, then another, suitably stronger yet conventional, circumferentially tensioned clamp may be substituted, such as a worm gear clamp. If necessary, even a crimp collar 52 may be used. It is to be understood that restrictor 20 can be likewise clamped in hose 50. As also shown in FIG. 7, the use of plastic material for the modified restrictor 64 also enables a plastic tuning cable 66 to be attached by inserting one end into a suitable modified outlet throat 28 of restrictor 64, thereby making a plastic-to-plastic connection or telescopic joint that can be ultrasonically welded or solvent welded, as at 68, to provide a perfect seal at low cost. Using plastic material to construct restrictor 64 (and/or 20) also avoids corrosion problems and provides an improved cleanliness level for the power steering system. In some high side applications, restrictor 64 or 20 may be similarly installed, but without use of any tuning cable, and yet certain noise reduction effects achieved.

Use of a generally constant diameter outside configuration or surface 21 for restrictor 20, 64 avoids the aforementioned problem of pinch points between the encircling flexible hose 50, 60 and restrictor 20 under even crimp collar clamping pressure. Making the restrictor symmetrical renders the part reversible in assembly so that there is no chance it can be assembled backwards by error in production.

It is also to be understood that various parameters of restrictor 20 may be varied to suit particular applications and tuning cable and/or return line restrictor hook-ups. For example, it has been found that the exit angle B is more important to be held within the range specified herein above, whereas the taper angle of inlet passage 24 may be made much greater and more abrupt without impairing anti-turbulence performance. For example, the entrance taper angle may range up to a value of about 20° if it is desired to foreshorten the overall axial length of restrictor 20, 64. In designing the configuration of the flow-through passage 22, 22', the various parameters of operation that determine the Reynolds number for the venturi must be observed to preferably stay below the Reynolds number for the onset of turbulent conditions.

Figure 8:
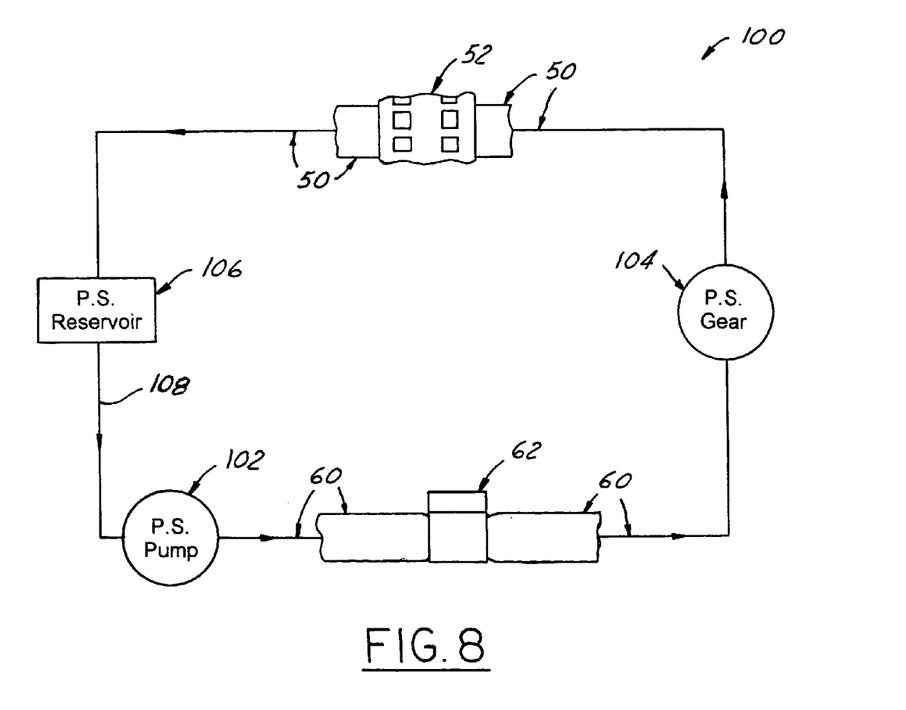
FIG. 8 is a schematic diagram of a power steering system employing the restrictor and tuning cable assembly of FIG. 7 in the high pressure side of the system and employing the balancing restrictor described in conjunction with FIGS. 1–6 in the low pressure return side of the system to provide one embodiment of an improved power steering system in accordance with the invention.

As set forth in more detail hereinafter in describing the power steering system of FIG. 8 of the invention, it should be understood that, although the "hiss" noise problem surfaced in the low pressure return side of the prior art power steering system, either restrictor 20 or 64 as constructed within the parameters of the present disclosure may certainly be employed in a tuning cable assembly, such as assembly 64–66 of FIG. 7, and connected in the high pressure output side, i.e., the pump-to-gear leg of the improved power steering circuit of the invention as shown in FIG. 8, and despite the absence of a "hiss" problem, still used there to advantage due to its other important advantageous features. Of course, the diameter of throat 26, of restrictor 64 is enlarged (e.g., from 0.109 inches (2.76 mm) to say 0.169 inches (4.29 mm) to accommodate the different system conditions in a high pressure side application. The standard taper angle of approximately 8° of either restrictor 20 or 64 also can be reduced down to say as low as 4°, but the overall length then required for the restrictor for such a shallow angle is usually too much of penalty in most applications.

Also, although one standard theory of employing a restrictor in achieving tuning or noise dampening in a tuning cable is its creation of a pressure drop, the restrictor 20, 64 of the invention has a substantially lower pressure drop than the conventional constant-diameter-passageway restrictor part, and yet it works well in high pressure side tuning cable noise reduction applications and/or low pressure side anti-shudder system pressure balancing applications. By shaping the restrictor through-passage profile into a venturi configuration, particularly the exit passage 28 in accordance with the foregoing disclosure, the pressure drop experienced with restrictor 20, 64 is much less than with the prior commercial restrictor in which turbulence was experienced. In addition to a reduced pressure drop, in one test there was a 30° F. temperature difference, i.e., temperature reduction, reflecting reduction in heat produced in the power steering system return line downstream of the restrictor. Thus, restrictor 20 may be advantageous in return side applications even where an audible "hiss" is not experienced as a problem, and likewise as to restrictor 64 on high side application. Reducing or eliminating turbulence also is believed to eliminate the deleterious effect of cavitation on the tuning cable or rubber hose containing the restrictor.

The feature of securing the surrounding hose 50, 60 to restrictor 20, 64 by an inexpensive hose clamp 62 (FIG. 7) to retain the restrictor allows lower strength plastic material to be used in constructing restrictor 20, 64, which then enables injection molding and material cost advantages versus using a crimped metal collar 52 that entails higher loads being placed on the restrictor. Such loads could cause a low strength plastic restrictor to break or collapse. Therefore restrictor 20 in the FIGS. 4 and 5 crimped collar embodiment is preferably made of high strength plastic (e.g., glass-filled nylon, etc.) material or metallic material. Use of plastic material for restrictor 20, 64 also avoids the problems of rust and machining debris experienced with prior metal restrictors. This leads to an improved cleanliness level for the finished power steering system.

Referring in more detail to FIG. 8, an improved power steering system 100 is schematically illustrated in one preferred but exemplary system embodiment of the invention. System 100 employs the usual power steering pump 102 coupled in communication via the high pressure side hose line 60 to the input of the power steering gear 104. The output of gear 104 is coupled through the low pressure side return hose line 50 to the inlet of a power steering reservoir 106 that in turn has its outlet coupled by a feed conduit 108 to the input of pump 102, thereby completing the hydraulic circuit of system 100. Note that the high pressure line 60 feeding hydraulic fluid from pump 102 to the power steering gear 104 is equipped with the tuning cable sub-assembly 64–66 of FIG. 7 with restrictor 64 held in place by the aforementioned hose clamp 62. Although the "hiss" noise problem discussed previously typically is not present in high pressure line 60, nevertheless the use of the venturi restrictor 64 in an associated tuning cable assembly provides the other advantages discussed above when employed in the high pressure side of the system. For example, the reduction in pressure drop introduced by a restrictor in the high pressure side, regardless of the material of which the restrictor is constructed, provides an improvement in system efficiency.

It is also to be understood that other methods of attachment of tuning cable 66 and other forms of tuning cables may be employed in association with variations of restrictor 64 within the scope of the invention. For example, the venturi restrictor could be constructed to receive the open end of a tuning cable, such as cable 66 being fitted telescopically over the outlet end of the restrictor rather than into the end of the restrictor. Likewise, another additional tuning cable (not shown) may be employed upstream of the venturi restrictor, and communicating with the entrance passage 24' of restrictor 64. In addition, metallic venturi restrictors may be suitably configured to enable attachment by electromagnetic forming (Magnaforming) of an open end of helically wound metal tuning cable onto or into the restrictor, or attachment by telescopic crimp attachment using conventional dogbone restrictor end shell crimping methods.

Figure 5:
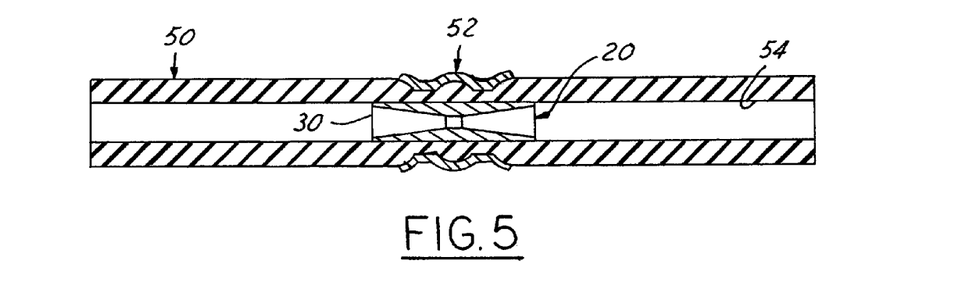
FIG. 5 is a cross sectional view taken on the line 5—5 of FIG. 4.
Figure 6:
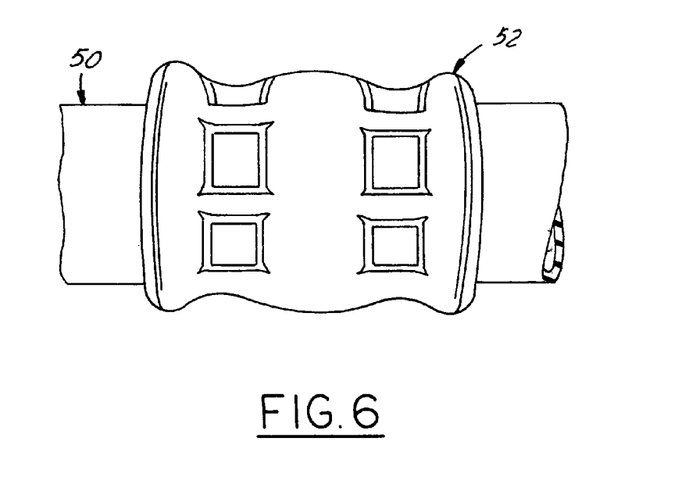
FIG. 6 is a fragmentary elevational view (photocopy) of a prototype restrictor-containing "balancing" section of a power steering system return line constructed in accordance with FIGS. 4 and 5.

System 100 employs in the low pressure hose line 50 the restrictor-hose assembly 20-50-52 of FIGS. 4–6 as described hereinabove, or variations thereof in accordance with the spirit and scope of the invention as described previously. Thus, the problem of audible "hiss" in the low pressure line 50 is at least substantially reduced if not eliminated due to the use of venturi restrictor 20 held in place in hose 50 by crimp collar 52. Of course, it now will be understood that collar clamp band 62 may be substituted for the crimp collar 52 to hold the low pressure side restrictor 20 in place in hose 50. At this point it also should be noted that another advantage of constructing restrictor 20 and/or 64 of plastic versus metallic material provides a burr-free exterior surface having a lower coefficient of sliding friction. This renders it easier to assemble restrictor 20, 64 along and into the fabric-surfaced bore 54 of hose 50, or like bore 67 of hose 60, with less likelihood of damage to the interior wall surface of the hose bores. In this connection, note that the shallow grooves 36 and intervening lands 38 employed to assist in sealing and securing the restrictor within the encircling hose material do not offer as much sliding resistance as a restrictor provided with larger-sized protruding ribs or corrugations found on some prior art restrictors.

Alternatively, power steering system 100 may only employ a venturi restrictor of the invention on the low pressure side while employing a conventional tuning cable construction on the high pressure side, or vice versa, although the use of the restrictors 20, 64 of the invention in both the high and low pressure sides, as shown in system 100, is presently preferred to maximize the advantages to be imparted by the invention to a power steering system. Of course, it also will be understood that the principles of the invention can be applied to equivalent return line restrictor constructions and high pressure side tuning cable assemblies in which the restrictor components and associated tuning cable components are varied from the examples disclosed. Additionally, for purposes of disclosure completeness, all of the aforementioned prior art patents cited hereinabove are incorporated herein by reference. Also, with reference to the aforementioned Cunningham U.S. Pat. No. 6,409,278, sealing and securing sub-assembly of the venturi restrictor 64 and tuning cable 66 in FIG. 7, and venturi restrictor 20 clamped in hose 50, can be considered to be literally the same as, or equivalent to, the Cunningham patent nipple tube fitting having a shank fitted within an elastomeric hose, when grooves 36 and lands 38 are constructed in accordance with the teaching the Cunningham '278 patent, and thus also covered by the claims thereof.

Although the illustrated embodiments have been discussed in conjunction with conventional hydraulic power-assist vehicle steering systems commonly employed in automotive vehicles of current manufacture, the invention is by no means limited to such applications. Several modifications and variations have been disclosed. Other modifications and variations will readily suggest themselves to persons of ordinary skill in the art. The invention is therefore intended to embrace all such modifications and variations as fall within the spirit and broad scope of the appended claims.

The invention claimed is:

1. In combination, a restrictor and a pulsation-absorbing flexible pipe for a pressure fluid device, said restrictor comprising a generally cylindrical body having a central flow-through passage open at its opposite axial ends, said flow-through passage being constructed in the form of a venturi having a flow-direction-convergent inlet passage leading into a constant diameter throat passage that in turn leads into a flow-direction-divergent outlet passage, the configuration of said venturi inlet, throat and outlet passages being constructed and arranged with a shallow taper angle in said inlet and outlet passages and said throat passage having a relatively short axial length much less than that of either said inlet or said outlet passages and such that turbulence is minimized in said restrictor outlet passage and/or immediately downstream thereof, under the pressure and fluid flow conditions in which the restrictor is adapted to be used, said body having a cylindrical exterior surface with an outside diameter (O.D. dimension) generally ranging from about 10.033 mm down to about 8.76 mm, wherein the axial cross sectional configuration of the interior of the restrictor, as defined by said inlet, throat and outlet passages, is symmetrical about all axes, wherein the respective taper angle of said inlet and outlet passages is in the range of about 4° to about 15°, wherein the internal diameter dimension of said throat passage is in the range of about 2.64 mm to about 4.57 mm, wherein the axial length of said throat passage is in the range of about 0.76 mm to about 12.2 mm, wherein the maximum I.D. of said inlet passage at its inlet end is the same as that of said outlet passage at its outlet end and is about 7.493 mm, wherein the external surface of said restrictor is interrupted in its central region by a series of shallow grooves that define therebetween a series of equally spaced and equal axial length lands, the axial length dimension of each said groove being in the range of about 0.127 mm to about 1.651mm, the axial length dimension of each said land being in the range of about 0.76 to about 2.667 mm, and wherein the depth dimension of each said groove being in the range of about 0.127 mm to about 406 mm.

2. The restrictor and pipe combination of claim 1 wherein said restrictor body is constructed entirely of plastic material injection molded in final form.

3. In combination, a restrictor and a pulsation-absorbing flexible pipe for a pressure fluid device, said restrictor comprising a generally cylindrical body having a central flow-through passage open at its opposite axial ends, said flow-through passage being constructed in the form of a venturi having a flow-direction-convergent inlet passage leading into a constant diameter throat passage that in turn leads into a flow-direction-divergent outlet passage, the configuration of said venturi inlet, throat and outlet passages being constructed and arranged with a shallow taper angle in said inlet and outlet passages and said throat passage having a relatively short axial length much less than that of either said inlet or said outlet passages and such that turbulence is minimized in said restrictor outlet passage and/or immediately downstream thereof, under the pressure and fluid flow conditions in which the restrictor is adapted to be used, said body having a cylindrical exterior surface with an outside diameter (O.D. dimension) generally ranging from about 10.033 mm down to about 8.76 mm, wherein the axial cross sectional configuration of the interior of the restrictor, as defined by said inlet, throat and outlet passages, is symmetrical about all axes, wherein the respective taper angle of said inlet and outlet passages is in the range of about 4° to about 15°, wherein the internal diameter dimension of said throat passage is in the range of about 2.64 mm to about 4.57 mm, wherein the axial length of said throat passage is in the range of about 0.76 mm to about 12.2 mm, and wherein the maximum I.D. of said inlet passage at its inlet end is the same as that of said outlet passage at its outlet end and is about 7.493 mm.

4. The restrictor and pipe combination of claim 3 wherein said pipe comprises a rubber composite hose and wherein the external surface of said restrictor is of constant diameter and is interrupted in a central region axially thereof by a series of grooves and intervening lands with sharp intersections, said grooves being of relatively shallow radial depth to thereby adapt the restrictor for being surrounded by said hose clamped thereto and sealed by engagement with the grooves and lands of the inner wall of the hose.

5. A hydraulic power steering system having a hydraulic power steering pump with its input communicating with the output of a power steering gear via a first hose section operable as a pulsation absorbing flexible fluid return line in said system, a first flow restrictor being combined with said system and operable in the low pressure side thereof as a pressure balancing restrictor installed in said first hose section, said hydraulic pump having its output communicating with the input of said power steering gear via a second hose section constructed as a pulsation-absorbing pressure fluid delivery hose, a second flow restrictor operably disposed in said second hose section and operable for damping pressure waves in the high pressure side of said system, said first restrictor comprising a generally cylindrical body having a central flow-through passage open at its opposite axial ends, said first restrictor flow-through passage being constructed in the form of a venturi having a flow-direction-convergent inlet passage leading into a constant diameter throat passage that in turn leads into a flow-direction-divergent outlet passage, the configuration of said venturi inlet, throat and outlet passages being constructed and arranged with a shallow taper angle in said inlet and outlet passages and said throat passage having a relatively short axial length much less than that of either said inlet or said outlet passages and such that turbulence is minimized in said restrictor outlet passage and/or immediately downstream thereof under the system pressure and fluid flow conditions, said first hose section comprising a flexible compliant hose section having an interior wall defining a fluid conducting passage extending from a first end to a second end of said first hose section and having a predetermined inner diameter, said wall being formed of a compliant material permitting volumetric expansion of said passage in response to an increase in pressure in the fluid, said first flow restrictor being operably disposed in said hose section between said passage ends for communicating fluid flowing therein from said first end to said second end of said hose section via said first restrictor flow-through restrictor passage, said venturi throat having a diameter smaller than said inner diameter of said hose section to thereby restrict alternating pressure components of said fluid flow between said ends of said hose section, and wherein the taper angle of said venturi outlet passage ranges between approximately 4° up to approximately 15°, said venturi restrictor inlet, throat and outlet passages thus being configured to operate as a non-turbulent flow venturi under the conditions existent in the operation of the hydraulic system to thereby reduce or eliminate heat and/or audible hiss-like noise.

6. The combination of claim 5 wherein said first restrictor is coupled at its outlet in fluid communication with the inlet of a tuning cable conduit extending co-axially with said first hose section downstream of said restrictor outlet in inwardly spaced relation to a said surrounding interior wall of said first hose section.

7. The combination of claim 6 wherein said restrictor and said tuning cable conduit are each made of plastic material and are coupled by being telescopically joined and plastically welded together.

8. A method of eliminating turbulence-induced hiss-like noise and/or heat in a pulsation-absorbing flexible pipe for a pressure fluid device adapted to be connected between a pressure fluid-feeding device and a working device operated by the pressure fluid discharged from the pressure fluid-feeding device wherein the flexible pipe has a restrictor positioned inside the bore of the flexible pipe between the ends of said flexible pipe and having a flow-through bore, said method comprising the step of:

(a) providing said restrictor as a venturi restrictor wherein the flow-through bore in said restrictor has a venturi tube cross section with a tapered flow-direction-convergent inlet bore leading to a constant diameter throat which in turn leads to a tapered flow-direction-divergent outlet, (b) designing said venturi inlet, throat and outlet so as to conduct fluid therethrough in the operating system of said pressure fluid device by matching the characteristics of the fluid, the operational pressures, fluid density and other system parameters such that the venturi operates below the lower critical value of the Reynolds number of the fluid flow through the restrictor to thereby minimize or eliminate turbulence-generated hiss-like noise and/or heat by minimizing or eliminating turbulence in the fluid in the restrictor outlet and/or exiting immediately downstream from the venturi restrictor and, (c) providing said restrictor to thereby accomplish steps (a) and (b) with a cylindrical exterior surface having an outside diameter (O.D. dimension) generally ranging from about 10.033 mm down to about 8.76 mm, wherein the axial cross sectional configuration of the interior of the restrictor, as defined by said inlet, throat and outlet passages, is symmetrical about all axes, wherein the respective taper angle of said inlet and outlet passages is in the range of about 4° to about 15°, wherein the internal diameter dimension of said throat passage is in the range of about 2.64 mm to about 4.57 mm, wherein the axial length of said throat passage is in the range of about 0.76 mm to about 12.2 mm, and wherein the maximum I.D. of said inlet passage at its inlet end is the same as that of said outlet passage at its outlet end and is about 7.493 mm.

9. The method of claim 8 wherein said flexible pipe comprises a hose section and said restrictor is coupled at its outlet in fluid communication with the inlet of a tuning cable conduit extending co-axially with said hose section downstream of said restrictor outlet in inwardly spaced relation to a surrounding interior wall of said hose section, and wherein said restrictor and said tuning cable conduit are each made of plastic material and are coupled by being telescopically joined and plastically welded together.

* * * * *